A. STILWELL.
Devices for Preventing Horses from Cribbing.

No. 141,962. Patented August 19, 1873.

Witnesses:

Inventor:
A. Stilwell
Per Munn & Co.
Attorneys.

UNITED STATES PATENT OFFICE.

ALEXANDER STILWELL, OF DWAAR'S KILL, NEW YORK.

IMPROVEMENT IN DEVICES FOR PREVENTING HORSES FROM CRIBBING.

Specification forming part of Letters Patent No. 141,962, dated August 19, 1873; application filed May 31, 1873.

*To all whom it may concern:*

Be it known that I, ALEXANDER STILWELL, of Dwaar's Kill, in the county of Ulster and State of New York, have invented a new and useful Improvement in Device to Prevent Cribbing in Horses, of which the following is a specification:

It is uncertain whether what is known as "cribbing" in horses is a habit or a disease; but it is well known that when a horse is afflicted with it, it lessens his value materially. He gnaws his manger, or seizes hold of anything with his teeth, and, by a peculiar action of the larynx, sucks in air and distends his bowels, and renders himself generally uncomfortable, as well as unsightly. Various contrivances have been devised as a remedy for this habit or disease; but nothing effectual has hitherto been invented.

My invention consists in a device or machine for causing pain when the horse attempts to crib, constructed as hereinafter described.

Figure 1:
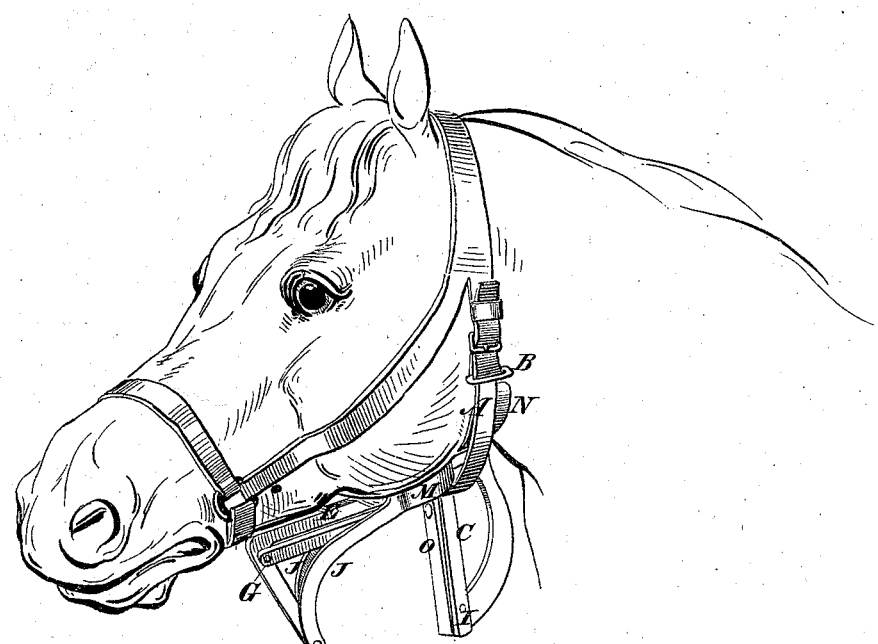
Figure 2:
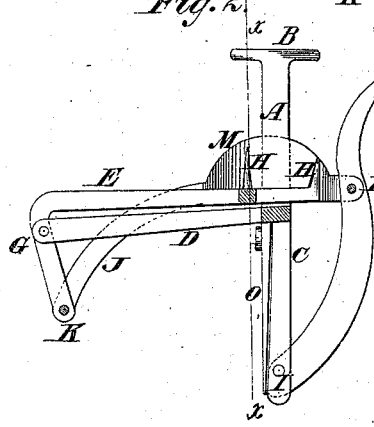
Figure 3:
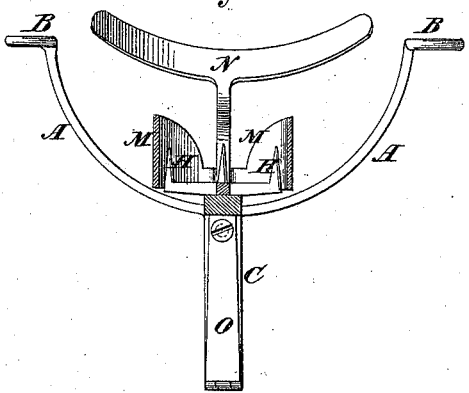

In the accompanying drawing, Figure 1 is a view, showing the device attached to the head-stall and applied to the horse. Fig. 2 is a side view. Fig. 3 is a section of Fig. 1 taken on the line *x x*.

Similar letters of reference indicate corresponding parts.

A is a semicircular metallic strap, with loops B B on the ends, to receive a leather strap or throat-latch for fastening the device to the horse. This strap A has two arms, C and D. C extends downward, and D outward or forward at about right angles with C. The ends of both are slotted, to receive pivoted levers E and F. E is a bent lever, the fulcrum-pin being at the angle G in slot of the arm D. The inner or long end of this bent lever is provided with spurs or points H. The other lever, F, is pivoted at its lower end in the slot of the arm C, the pivot I being the fulcrum of this lever. J J are two curved bars, which are connected at one end by a pivot-pin or rivet to the end of the short arm of the lever E, as seen at K. The other ends of these curved bars are attached, by a screw or rivet, to the lever F at the point L. These bars J J are provided with circular flanges M M, which extend upward, and act as guards around the points H, to render the point harmless while the horse remains quiet or does not attempt to crib. The upper end of the lever F is provided with a cross, N, which is preferably curved, as seen in Fig. 3, which, in fastening the device to the horse, is brought in contact with the throat. O represents a spring, attached at its upper end to the arm C. This spring extends down in contact with the arm, and bears at its lower end against the end of the lever F, as seen in Fig. 2. This spring keeps the lever F and the other parts in the position seen in Fig. 2, the points H being all the time guarded, and the horse protected, by the flanges M M.

It will be seen that a pressure downward upon the cross N will draw (by means of the bars J J) upon the short arm of the lever E, and cause the long arm of that lever and the points H to rise. This is the action that takes place when the horse attempts to crib. The cross N being in contact with his throat, the cribbing action distends the larynx and presses upon the cross, which causes the points H to rise and punish him. When he is quietly eating his feed this action does not take place, and he is fully protected.

This machine is made of iron or other suitable metal. In size it need not exceed four or five inches in any one direction, and in weight it need not exceed five or six ounces; but it may be made of any size or proportions.

I do not confine myself to the precise form or arrangement of any of the parts described, as variations may be made in many ways without departing from my invention.

Having thus described my invention, I claim as new and desire to secure by Letters Patent—

1. A device for preventing horses from cribbing, formed of a frame, A D C, bent or elbow lever E, provided with spurs, and a lever, F, arranged substantially as shown and described.

2. The cross N or its equivalent, in combination with the lever F and the guards M M, as and for the purposes described.

3. The combination of the lever F and the cross N with the points H or their equivalent, substantially as and for the purposes described.

ALEXANDER STILWELL, M. D.

Witnesses:
AUGUSTUS F. PERRINE, Esq.,
JONATHAN L. VERMOOY.